United States Patent Office 3,547,922
Patented Dec. 15, 1970

3,547,922
1-[(3-INDOLYL)-LOWER-ALKYL]-4-
SUBSTITUTED-PIPERAZINES
Sydney Archer, Bethlehem, N.Y., assignor to Sterling Drug Inc., New York, N.Y., a corporation of Delaware
No Drawing. Filed Oct. 7, 1966, Ser. No. 584,979
Int. Cl. C07d 51/70
U.S. Cl. 260—268       3 Claims

ABSTRACT OF THE DISCLOSURE

New 1-[(3-indolyl)-lower-alkyl]-4-cycloalkyl- and 4-cycloalkyl-lower-alkylpiperazines having adrenolytic, hypotensive, cardiac depressant, psychomotor depressant, anti-inflammatory, hexobarbital potentiation, anti-emetic, hypothermic, and skeletal muscle relaxant activities.

This invention relates to acertain 1-[(3-indolyl)-lower-alkyl]-4-substituted-piperazines of the formula

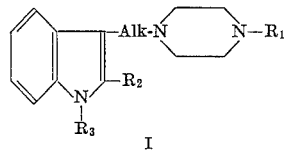

I where Alk is lower-alkylene-, $R_1$ is cycloalkyl or cycloalkyl-lower-alkyl; and $R_2$ and $R_3$ are organic groups whose nature generally are immaterial provided they are inert in the processes used to prepare the compounds of Formula I. Thus $R_2$ can be hydrogen, lower-alkyl, or phenyl; and $R_3$ can be hydrogen, lower-alkyl, or phenyl-lower-alkyl.

As used herein, the terms lower-alkyl and lower-alkylene means lower-alkyl or lower-alkyene containing from one to seven carbon atoms which can be either straight or branched. Thus when $R_2$ or $R_3$ represent lower-alkyl, they can be methyl, ethyl, n-propyl, isopropyl, isobutyl, n-hexyl, and the like, and Alk, as lower-alkylene, can be methylene, 1,2-ethylene, 1,3-propylene, 2-methylbutylene, 2-ethylpentylene, 1,7-heptylene, and the like.

As used herein, the term cycloalkyl means cycloalkyl containing from three to seven carbon atoms, and thus when $R_1$ represents cycloalkyl or cycloalkyl-lower-alkyl, it represents cyclopropyl, cyclopropylmethyl, cyclobutyl, cyclopentyl, cyclohexyl, cyclohexylmethyl, 2-cyclohexylethyl, and the like.

In the above general Formula I, when $R_1$, $R_2$, or $R_3$ is phenyl, or when $R_1$ is benzhydryl, or cinnamyl, the benzene ring thereof can bear one or more substituents of low molecular weight and of such nature that they do not interfere with or take part in the reactions, to be described hereinafter, used in the preparation of the compounds. Moreover, the benzene ring of the indole nucleus can also be further substituted in any of the available positions thereof by such substituents. Examples of such substituents include halogen, lower-alkyl, lower-alkoxy, lower-alkylmercapto, lower-alkylsulfinyl, lower-alkylsulfonyl, nitro, trifluoromethyl, methylenedioxy, ethylenedioxy, carbo-lower-alkoxy, benzyloxy, benzyl, sulfamyl, amino, lower-alkanoylamino, lower-alkoxycarbonylamino, lower-alkanoyloxy, hydroxy, and the like.

Some of the compounds of Formula I above are disclosed and claimed in U.S. Pat. 3,188,313. All of the compounds of Formula I, whether disclosed and claimed in U.S. Pat. 3,188,313 or disclosed and claimed herein, are very valuable compounds having anti-inflammatory activity as well as depressant action on the central and autonomic nervous systems, the cardiovascular system, and the skeletal muscular system, and more specifically possess anti-inflammatory, adrenolytic, cardiac depressant, hypotensive, anti-emetic, hypothermic, sedative, tranquilizer, and skeletal muscle relaxant properties.

A number of processes for preparing the compounds of Formula I are disclosed in U.S. Pat. 3,188,313, which include alkylation of a 1-substituted-piperazine with a (3-indolyl)-lower-alkyl halide; Mannich reaction of an indole, a 1-substituted-piperazine, and formaldehyde (to prepare the compounds of Formula I where Alk is methylene); and a number of methods involving reduction of an oxo function, either in the side chain represented by Alk or in the piperazine ring. With the possible exception of the Mannich reaction, which is limited in usefulness to the preparation of compounds where Alk is methylene, each of the above-described processes suffers from one or more of several disadvantages. For example, each of the previous methods requires several synthetic steps for the preparation of the final products, since the procedures require the use of starting materials or intermediates which are not always readily available. Also many of the known methods require, as reducing agent, alkali metal aluminum hydrides which are rather expensive reducing agents and which furthermore are not readly adaptable to large-scale commercial use. It has also been found that products prepared on a large scale by methods involving use of an alkali metal aluminum hydride may be contaminated with a very stubborn impurity which resists removal by conventional purification procedures.

It has now been found that the compounds of Formula I can be prepared economically, in excellent yield, and in a high state of purity by essentially a one-step reaction involving cyclization under acid conditions of an ω-[4-substituted - 1 - piperazinyl] - lower - alkanaldehyde phenylhydrazone, ω - [4 - substituted - 1 - piperazinyl]-lower-alkyl lower-alkyl ketone phenylhydrazone, or ω-[4 - substituted - 1 - piperazinyl] - lower - alkyl phenyl ketone phenylhydrazone of the formula:

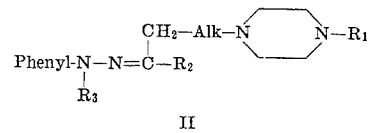

II where $R_1$, $R_2$, $R_3$, and Alk have the meanings given above, and phenyl represents the precursor of the benzenoid ring of the indole nucleus in the products of Formula I. It will thus be appreciated that the compounds of Formula II above can be substituted in the phenyl ring by one or more substituents of the nature described above.

The compounds of Formula I are prepared from the compounds of Formula II by heating the latter in the presence of an acid, for example hydrochloric acid, sulfuric acid, p-toluenesulfonic acid, glacial acetic acid, and the like, and in an organic solvent inert under the conditions of the reaction, for example methanol, ethanol, isopropanol, benzene, toluene, and the like. When glacial acetic acid is used as the acid condensing agent, it can also be used in excess as the solvent medium as well.

The reaction is represented by the equation:

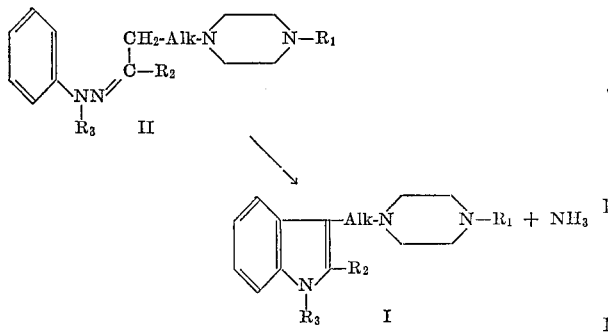

The hydrazones of Formula II in turn are prepared by reacting a phenylhydrazine of Formula III with an ω-(4-substituted - 1 - piperazinyl)aldehyde, an ω-(4-substituted - 1 - piperazinyl)-lower-alkanone, or an ω-(4-substituted - 1 - piperazinyl)-lower-alkyl phenyl ketone of Formula IV where $R_2$ is hydrogen, lower-alkyl, or phenyl, respectively. The reaction is represented by the equation:

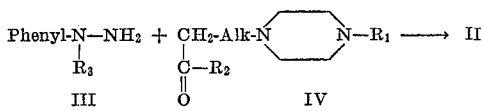

and generally takes place at room temperature. Like the cyclization of the hydrazones of Formula II to the products of Formula I, the reaction is advantageously carried out in an organic solvent inert under the conditions of the reaction, for example methanol, ethanol, isopropanol, benzene, toluene xylene, and the like, and in the presence of an acid, for example hydrochloric acid, sulfuric acid, p-toluenesulfonic acid, glacial acetic acid, and the like.

The hydrazones of Formula II thus formed can, if desired, be isolated from the reaction mixture before cyclizing to the indole final products. It is preferred to carry the reaction to completion, without isolating the intermediate hydrazones, by heating the reaction mixture containing the hydrazone which itself is formed at lower temperatures.

The novel compounds of the instant invention are the bases of Formula I. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formula I not only represents the structural configuration of the bases of the invention but is also representative of the structural entity which is common to all of the compounds, whether in the form of the free bases or in the form of the acid-addition salts of the bases. It has been found that by virtue of this common structural entity, the bases of Formula I and their acid-addition salts have inherent pharmacodynamic activity of a type to be more full described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, it is preferred of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, the salts of the compounds of Formula I are useful as characterizing or identifying derivatives of the three bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively they can be converted to pharmaceutically-acceptable acid-addition salts by, for example ion-exchange procedures.

It will be appreciated from the foregoing that all of the acid-addition salts of the new bases of Formula I are useful and valuable compounds, regardless of considerations of solubility, toxicity, physical form, and the like.

The novel feature of the compounds of the invention, then, resides in the concept of the bases and cationic forms of the new indoles, and not in any particular acid anion associated with the salt forms of the compounds; rather, the acid anions, which can be associated in the salt forms, are in themselves neither novel nor critical and therefore can be any acid anion or acid-like substance capable of salt formation wth bases. In fact, in aqueous solutions, the base form or water-soluble acid-addition salt form of the compounds of the invention both possess a common protonated cation or ammonium ion.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formula I according to standard pharmacological test procedures has demonstrated that they possess adrenolytic, hypotensive, cardiac depressant, psychomotor depressant, anti-inflammatory, hexobarbital potentiation, anti-emetic, hypothermic and skeletal muscle relaxant activities thus indicating their usefulness as adrenolytic, hypotensive, cardiovascular, tranquilizer, sedative, anti-emetic, hypothermic, skeletal muscle relaxant, and anti-inflammatory agents.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

The chemical structures of the compounds of the invention are established by their mode of synthesis and are corroborated by infrared and ultraviolet spectra, and by the correspondence between calculated values for the elements and values found by chemical analysis.

The following examples will further illustrate specific embodiments of the invention.

EXAMPLE 1

1-(3-acetylpropyl)-4-phenylpiperazine
[IV: $R_1$ is $C_6H_5$; $R_2$ is $CH_3$; Alk is $CH_2CH_2$]

A mixture of 120.6 g. (1.0 mole) of 5-chloro-2-pentanone, 81 g. (0.5 mole) of 1-phenylpiperazine, 15.9 g. (1.5 mole) of anhydrous powdered sodium carbonate, and 260 ml. of xylene was heated and stirred on a steam bath for twenty-two hours, cooled, and filtered to remove insoluble inorganic salts. The filter was washed with ether, and the combined filtrate and washings were combined, taken to dryness under reduced pressure and the residual oil distilled in vacuo giving 80.0 g. of 1-(3-acetylpropyl)-4-phenylpiperazine, B.P. 153–160° C./0.1–0.3 mm.; $n_D^{25}=1.5475$.

EXAMPLES 2–4

By reacting an appropriate ω-halo-lower-alkanaldehyde ($R_2$ is hydrogen), ω-halo-lower-alkanone ($R_2$ is lower-alkyl), or ω-halo-lower-alkyl phenyl ketone ($R_2$ is phenyl) with an appropriate 1-substituted-piperazine in the presence of anhydrous sodium carbonate following the manipulative procedure described above in Example 1, there are obtained the compounds of formula IV listed below in Table 1.

TABLE 1

| Example | $R_1$ | $R_2$ | Alk |
|---|---|---|---|
| 2 | $C_6H_{11}$ | H | $(CH_2)_2$ |
| 3 | $C_6H_{11}$ | H | $(CH_2)_3$ |
| 4 | Cyclohexylmethyl | $CH_3$ | $CH_2CH_2$ |

EXAMPLE 5

1 - [2 - (2 - methyl - 3 - indolyl)ethyl] -(4-fluorophenyl) piperazine [I: $R_1$ is 4-$FC_6H_4$; $R_2$ is $CH_3$; $R_3$ and indole substituent are H; Alk is $CH_2CH_2$]

To a solution of 10.8 g. (0.1 mole) of phenylhydrazine and 200 ml. of isopropanol was added 30 g. (0.1 mole) of 1-(3-acetylpropyl)-4-(4-fluorophenyl)piperazine at room temperature. The hydrazone which separated on scratching was collected and recrystallized once from methanol giving 19.5 g. of 3-[4-(4-fluorophenyl)-1-piperazinyl] propyl methyl ketone phenylhydrazone, M.P. 223–224° C.

*Analysis.*—Calc'd for $C_{21}H_{28}ClFN_4$ (percent): Cl, 9.07; N, 14.32. Found (percent): Cl, 9.07; N, 14.17.

The above hydrazone was refluxed overnight in 200 ml. of 4 N ethanolic hydrogen chloride, and the mixture was then cooled, diluted with 100 ml. of ether, and filtered. The solid filter was dissolved in 250 ml. of methanol, treated with 10% aqueous sodium hydroxide until basic, diluted with water to the cloud point, and cooled to induce crystallization. The solid which separated out was collected by filtration and recrystallized from methanol to give 8.5 g. of 1-[2-(2-methyl-3-indolyl)ethyl]-4-(4-fluorophenyl)piperazine, M.P. 122–123° C.

EXAMPLE 6

1 - [2 - (2 - methyl - 3 - indolyl)ethyl] - 4 - (3-chlorophenyl)piperazine hydrochloride [I: $R_1$ is 3-$ClC_6H_4$; $R_2$ is $CH_3$; $R_3$ and indole substituent are H; Alk is $CH_2CH_2$]

Phenylhydrazine, (10.8 g., 0.1 mole) was reacted with 31.7 g. (0.1 mole) of 1-(3-acetylpropyl)-4-(3-chlorophenyl)piperazine in 100 ml. of warm isopropanol according to the manipulative procedure described above in Example 5. The intermediate hydrazone was recrystallized from methanol to give 20.5 g. of 3-[4-(3-chlorophenyl)-1-piperazinyl]propyl methyl ketone phenylhydrazone, M.P. 220–221° C. (uncorr.).

*Analysis.*—Calc'd for $C_{21}H_{28}Cl_2N_4$ (percent): C, 61.91; H, 6.92; Cl, 8.70. Found (percent): C, 61.92; H, 6.96; Cl, 8.97.

The above hydrazone was heated under reflux in 200 ml. of 4 N ethanolic hydrogen chloride for four hours, and the reaction mixture was cooled and filtered. The crude material thus obtained was recrystallized from methanol giving 12.7 g. of 1-[2-(2-methyl-3-indolyl)ethyl] 4-(3-chlorophenyl)piperazine hydrochloride, M.P. 252–253° C.

EXAMPLE 7

1 - [2 - (2 - methyl - 5,6 - dimethoxy - 3 - indolyl)ethyl] 4-phenylpiperazine hydrochloride [I: $R_1$ is $C_6H_5$; $R_2$ is $CH_3$; $R_3$ is H; indole substituent is 5,6-di-$CH_3O$; Alk is $CH_2CH_2$]

A solution of 4 g. (0.02 mole) of 3,4-dimethoxyphenylhydrazine in water was mixed with an aqueous solution of 5.6 g. (0.02 mole) of 1-(3-acetylpropyl)-4-phenylpiperazine, and the combined solution was allowed to stand at room temperature for one hour.

The mixture was then rendered basic with sodium carbonate, extracted with ethyl acetate and the organic extracts dried and taken to dryness in vacuo. Recrystallization of the residue from ether afforded 0.7 g. of 3-(4-phenyl-1-piperazinyl)propyl methyl ketone 3,4-dimethoxyphenylhydrazone, M.P. 123–127° C. (uncorr.).

The latter was dissolved in 2 ml. of 5 M ethanolic hydrochloric acid and refluxed on a steam bath for one hour. The solid which separated on cooling was collected and recrystallized from isopropanol to give 1-[2-(2-methyl-5,6-dimethoxy-3-indolyl)ethyl]-4-phenylpiperazine hydrochloride.

EXAMPLES 8–10

By reacting the appropriate phenylhydrazine of Formula III and the appropriate ω-(4-substituted-1-piperazinyl) - lower - alkanaldehyde, ω-(4-substituted-1-piperazinyl)-lower-alkanone, or ω-(4-substituted-1-piperazinyl)-lower-alkyl phenyl ketone of Formula IV under the conditions described in Examples 5–7, there can be obtained the ω - [4-substituted-1-piperazinyl]-lower-alkanaldehyde phenylhydrazones, ω-[4-substituted-1-piperazinyl]-lower-alkyl lower-alkyl ketone phenylhydrazones, or ω-[4-substituted-1-piperazinyl]-lower-alkyl phenyl ketone phenylhydrazones of formula II listed in Table 2 below, where $R_3$ in each instance is H.

TABLE 2

| Example | $R_1$ | $R_2$ | Phenyl substit. | Alk |
|---|---|---|---|---|
| 8 | $C_6H_{11}$ | H | H | $(CH_2)_3$ |
| 9 | $C_6H_{11}$ | H | H | $CH_2CH_2$ |
| 10 | $C_6H_{11}CH_2$ | $CH_3$ | 3-$CH_3OOO$ | $CH_2CH_2$ |

EXAMPLES 11–13

Reaction of the ω-[4-substituted-1-piperazinyl]-lower-alkanaldehyde phenylhydrazones, ω-[4-substituted-1-piperazinyl]-lower-alkyl-lower-alkyl ketone phenylhydrazones, and ω - [4-substituted-1-piperazinyl]-lower-alkyl phenyl ketone phenylhydrazones of Formula II described above in Examples 8–10 with ethanolic hydrogen chloride using the manipulative procedure described above in Examples 5–7, affords the 1-[(3-indolyl)-lower-alkyl]-4-substituted-piperazines of Formula I described, respectively, in Examples 11–13 in Table 3 below, where $R_3$ in each instance is H.

TABLE 3

| Example | $R_1$ | Indole $R_2$/substit. | Alk | Base or salt/M.P. |
|---|---|---|---|---|
| 11 | $C_6H_{11}$ | H/H | $(CH_2)_3$ | Base 132. 0–133. 0° C. |
| 12 | $C_6H_{11}$ | H/H | $CH_2CH_2$ | Bzse 153. 0–154. 0° C. |
| 13 | $C_6H_{11}CH_2$ | $CH_3$/6-$CH_3COO$ | $CH_2CH_2$ | |

I claim:
1. A compound having the formula

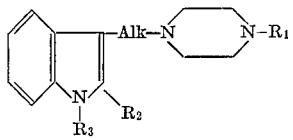

wherein $R_1$ is cycloalkyl or cycloalkyl-lower-alkyl and wherein the cycloalkyl moiety has from three to seven ring carbon atoms; $R_2$ is hydrogen, lower-alkyl, or phenyl; $R_3$ is hydrogen, lower-alkyl, or phenyl-lower-alkyl; and Alk is lower-alkylene having from one to seven carbon atoms.

2. 1 - [2-(3-Indolyl)ethyl]-4-cyclohexylpiperazine according to claim 1 wherein $R_1$ is cyclohexyl; $R_2$ and $R_3$ are hydrogen; and Alk is 1,2-ethylene.

3. 1 - [3-(3-Indolyl)propyl]-4-cyclohexylpiperazine according to claim 1 wherein $R_1$ is cyclohexyl; $R_2$ and $R_3$ are hydrogen; and Alk is 1,3-propylene.

References Cited
UNITED STATES PATENTS
3,188,313   6/1965   Archer _____ 260—268

OTHER REFERENCES
Fieser, Organic Chemistry, Third Edition (1956) pp. 46–47.

D. G. DAUS, Primary Examiner

U.S. Cl. X.R.
260—240, 566, 999

UNITED STATES PATENT OFFICE
CERTIFICATE OF CORRECTION

Patent No. 3,547,922      Dated December 15, 1970

Inventor(s) Sydney Archer

It is certified that error appears in the above-identified patent and that said Letters Patent are hereby corrected as shown below:

Column 1, line 19, "acertain" should read --certain--; line 36, "means" should read --mean--.

Column 2, line 31, "readly" should read --readily--; line 53 "phenyl" should read --Phenyl--.

Column 3, line 44, "Formula 1." should read --formula 1 and the acid-addition salts of said bases--; line 64, "full" should read --fully--.

Column 4, line 15, "three" should read --free--.

Column 6, line 56, "3-CH$_3$oOO" should read --3-CH$_3$COO--; line 74, "Bzse" should read --Base--.

Signed and sealed this 11th day of January 1972.

(SEAL)
Attest:

EDWARD M. FLETCHER, JR.
Attesting Officer

ROBERT GOTTSCHALK
Acting Commissioner of Patent